United States Patent
Foos

(10) Patent No.: US 6,250,908 B1
(45) Date of Patent: Jun. 26, 2001

(54) CONDUIT-MAKING APPARATUS WITH A VARIABLE DIAMETER WINDING DRUM

(75) Inventor: George J. Foos, Grand Rapids, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/256,651

(22) Filed: Feb. 23, 1999

(51) Int. Cl.[7] .................................................. B29C 53/62
(52) U.S. Cl. ...................... 425/391; 156/429; 156/431; 425/321; 425/322; 425/325; 425/402
(58) Field of Search .................................. 425/321, 322, 425/325, 391, 402; 156/429, 431

(56) References Cited

U.S. PATENT DOCUMENTS

| | | |
|---|---|---|
| 2,378,211 | 6/1945 | Furness . |
| 2,460,325 | 2/1949 | Whitson et al. . |
| 3,532,580 * | 10/1970 | Kanao . |
| 3,555,170 | 1/1971 | Petzetakis . |
| 3,728,883 | 4/1973 | Lamborn et al. . |
| 3,748,952 | 7/1973 | Petzetakis . |
| 3,781,041 | 12/1973 | Petzetakis . |
| 3,843,302 | 10/1974 | Petzetakis . |
| 3,870,441 | 3/1975 | Petzetakis . |
| 3,914,151 | 10/1975 | Poulsen . |
| 3,917,500 | 11/1975 | Petzetakis et al. . |
| 3,926,223 | 12/1975 | Petzetakis . |
| 3,953,057 | 4/1976 | Petzetakis . |
| 4,033,808 | 7/1977 | Petzetakis . |
| 4,042,231 | 8/1977 | Kopcyznski et al. . |
| 4,164,135 | 8/1979 | Clavin . |
| 4,172,748 | 10/1979 | Petzetakis . |
| 4,177,914 | 12/1979 | Clavin . |
| 4,233,020 | 11/1980 | Oswald . |
| 4,389,180 | 6/1983 | Gordon . |
| 4,436,574 | 3/1984 | Long et al. . |
| 4,575,400 | 3/1986 | Ueda et al. . |
| 4,793,790 | 12/1988 | Reinhold . |
| 4,824,502 | 4/1989 | Nagayoshi et al. . |
| 4,867,671 | 9/1989 | Nagayoshi et al. . |
| 5,060,698 | 10/1991 | Anastassakis et al. . |
| 5,076,025 | 12/1991 | Reeble . |
| 5,096,634 | 3/1992 | Tsadares et al. . |
| 5,217,723 | 6/1993 | Tsingopoulos . |
| 5,261,988 | 11/1993 | Dikis et al. . |
| 5,285,947 | 2/1994 | Depperman . |
| 5,330,345 * | 7/1994 | Strock et al. . |
| 5,460,501 | 10/1995 | Wise et al. . |
| 5,505,897 | 4/1996 | Wise et al. . |
| 5,535,938 | 7/1996 | Leduc . |
| 5,945,138 * | 8/1999 | Wise et al. . |

FOREIGN PATENT DOCUMENTS

| | | |
|---|---|---|
| 8905723 | 6/1989 | (WO) . |
| 9527601 | 10/1995 | (WO) . |

* cited by examiner

Primary Examiner—Nam Nguyen
Assistant Examiner—Joseph Leyson
(74) Attorney, Agent, or Firm—Jones, Day, Reavis & Pogue

(57) ABSTRACT

An apparatus is disclosed for making a conduit or pipe. An extruder is provided for producing a strip of continuous thermoplastic. A winding drum receives the strip and helically winds the strip around the drum's perimeter to form a conduit having an inner diameter corresponding to the outer diameter of the drum. The drum includes a core tube surrounded by a plurality of rollers which define the outer diameter of the drum. The rollers rotate to advance the strip around the drum. A plurality of support columns are used to support the roller at each end. A hub assembly is used to movably support the support columns in slidable engagement. The support columns are radially displaced by the hub assembly between two positions, in order to vary the outer diameter of the drum between two diameters.

2 Claims, 3 Drawing Sheets

CONDUIT-MAKING APPARATUS WITH A VARIABLE DIAMETER WINDING DRUM

BACKGROUND OF THE INVENTION

The present invention is directed to the field of apparatuses for the formation of large-diameter ducts, pipes, conduits or the like, generally cylindrical in shape, from an extruded thermoplastic strip. U.S. Pat. No. 4,033,808 to Petzetakis discloses an apparatus for making large-diameter pipe from thermoplastic resin, the disclosure of which is hereby incorporated by reference. A synthetic-resin, hollow-profile strip is extruded and coiled helically around a winding drum to make a continuous tube. Adjacent turns of the helix are thermally fused together with axial pressure being applied on the strip so as to make a liquid-tight tube which can be used for a number of applications, particularly for subterranean use, e.g. as a waste or sewer conduit, storm sewer, or any other liquid conveyance.

The previous apparatus includes a drum for forming the conduit therearound, and the drum includes a core tube surrounded by a plurality of rollers upon which the extruded thermoplastic rolls as it rotates around the drum. The drum of the previous apparatus is fixed in diameter so only one diameter of pipe may be produced with each apparatus. Since a typical manufacturer of pipe manufactures conduit or pipe of several different diameters, it would be necessary to purchase and maintain several such apparatuses, which would involve considerable investment and ongoing expense.

In a conventional conduit-making process, "residence time" is the period in which plastic remains on the drum during the manufacturing process. Since the rate of manufacture is limited by residence time, it would be desirable to shorten this interval by increasing the drum speed. Typical manufacturing rates can range from 300 to 3500 lbs./hr. depending on the size of the pipe. Usually, large-diameter pipe or conduit is manufactured at about 1000–2000 lbs./hr. As the rate is increased, however, the conduit may not be completely cooled when coming off the drum. This makes the conduit shrink slightly inward, undesirably decreasing the final conduit diameter by a small, yet significant, amount.

SUMMARY OF THE INVENTION

In view of the above-indicated drawbacks with the previous device apparatus, there is therefore a need for a pipe or conduit apparatus which preserves the advantages of the previous device while manufacturing large diameter pipe and conduit of more than one diameter.

There is also a need for an apparatus having a drum that permits precision variations in pipe/conduit diameter to allow for the decreasing of residence time, thereby increasing the rate of manufacture.

These needs and others are satisfied by the present invention in which an apparatus for making a conduit is disclosed. An extruder is provided for producing a strip or ribbon of continuous thermoplastic. A winding drum receives the strip from the extruder in a pliable, fusible, substantially melted state, and helically winds the strip around the drum's perimeter to form a conduit having an inner diameter corresponding to the outer diameter of the drum. The drum includes a core tube surrounded by a plurality of rollers which define the outer diameter of the drum. The rollers rotate to advance the strip around the drum.

A plurality of support columns are used to support the rollers at each end. A hub assembly is used to movably support the support columns in slidable engagement. The support columns are radially displaced along the hub assembly between two positions, in order to vary the outer diameter of the drum between two diameters.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
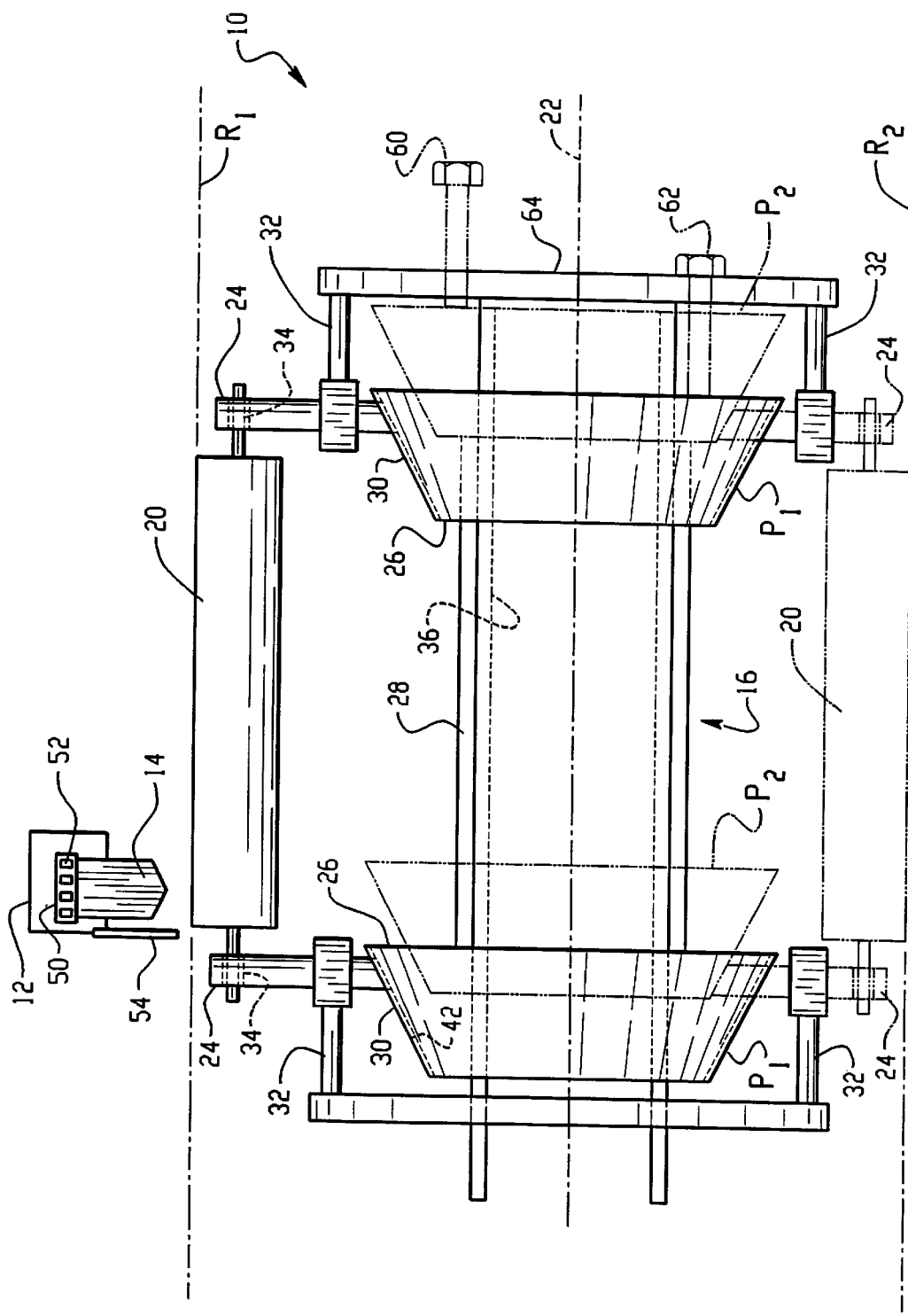
FIG. 1 is a side-sectional view illustrating the winding drum and related components as according to the present invention.

The figures are for purposes of illustrating the preferred embodiment of the invention and not for limiting the same. The present invention is directed to a pipe or conduit-making apparatus having a variable diameter winding drum generally indicated by reference numeral 10. An extruder 12 is provided to extrude a continuous strip or ribbon 14 of thermoplastic of such material as is appropriate for conduit or pipe manufacture, including but not limited to: PVC, polyethylene or any other suitable type of plastic material. The winding drum receives the strip of thermoplastic in a pliable, fusible, substantially melted state, and rotates as described in detail below to helically wind the strip around the perimeter of the drum. The conduit formed thereby has an inner diameter corresponding to the outer diameter of the drum 10.

Figure 2:
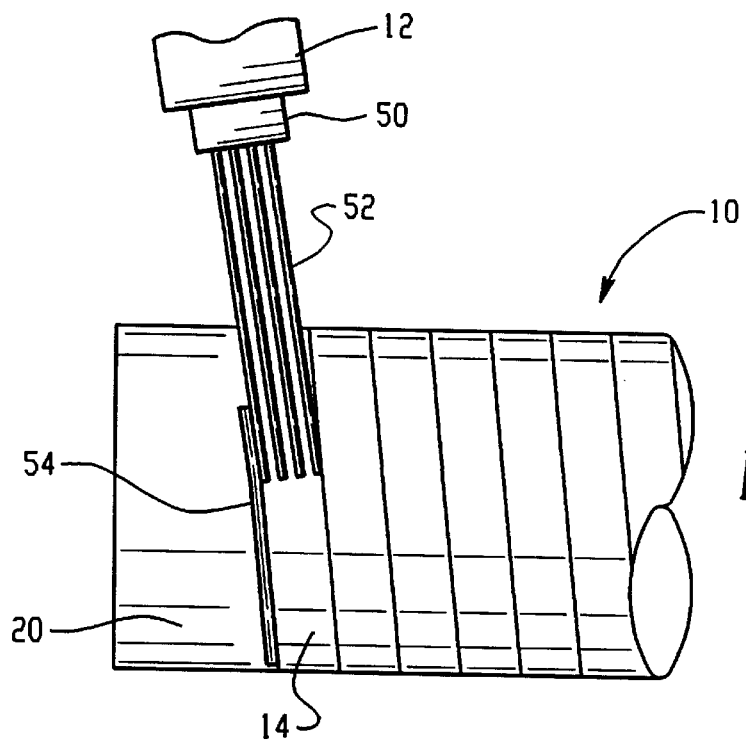
FIG. 2 is a top detail view of the present extruder head and related components.
Figure 3:
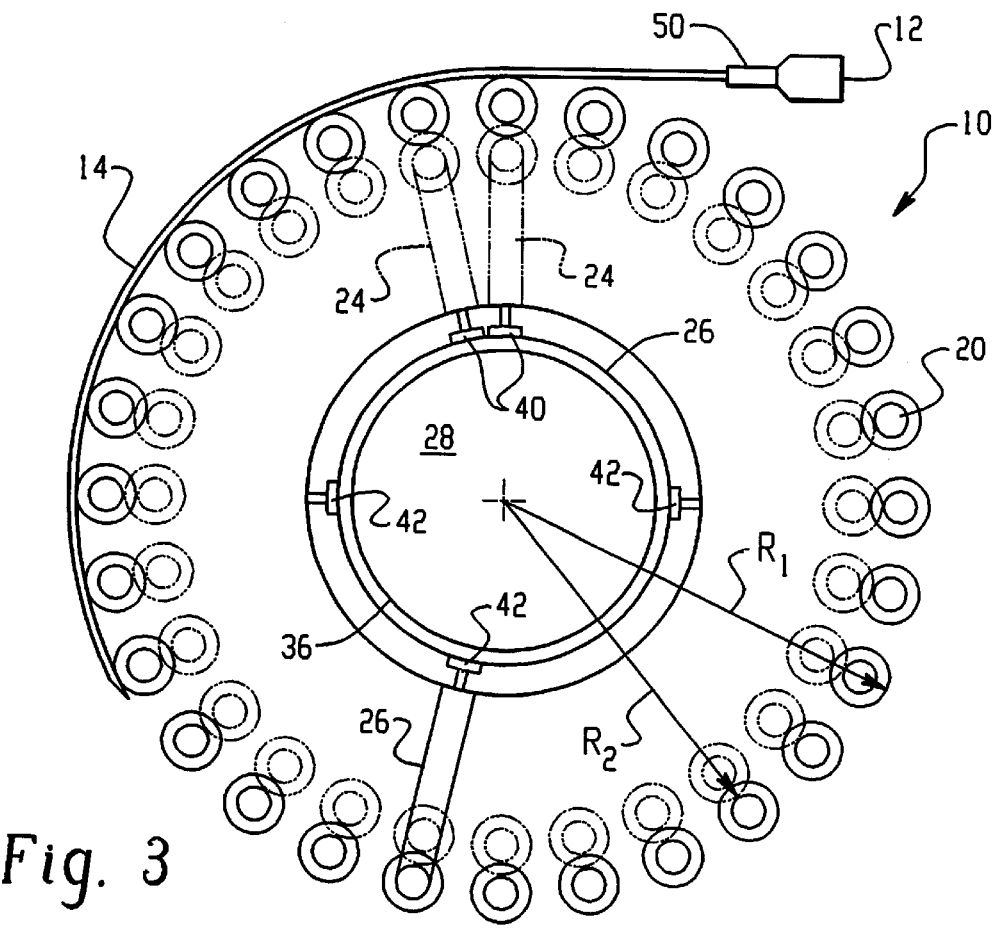
FIG. 3 is a front-sectional view illustrating the winding drum and related components as according to the present invention.

The drum 10 includes a core tube 36 surrounded by a plurality of rollers 20. The outer diameter of the drum 10 is defined by the plurality of rollers 20, which axially rotate as the strip advances around the drum 10. The plastic making up the pipe is extruded in a rectangular ribbon configuration, called a "profile". The shape of the profile, as it is wrapped onto the rollers of the drum, is preferably formed by a die 50 having calibration rods 52, and attached to the extruder 12, as is shown in FIG. 2. The position of the profile is preferably set by a guide plate 54, which urges the profile into contact with the adjoining wrap, as is also shown in FIG. 2. Of course, it should be appreciated that any other means of shaping and positioning the profile can be used without departing from the invention.

The rollers are cocked and slightly slanted along the drum to create a helix angle. As the profile winds around the diameter of the drum, it also coils longitudinally along the drum axis 22 following the helix angle. The calibration rods 52 and guide plates 54 are aligned so that the straight profile coming off the extruder meets edge to edge the plastic wrapping up from the previous turn of the drum. Since the plastic is still somewhat melted, the two sections fuse to form a weld.

The outer diameter of the drum 10 is varied in the present invention by a hub assembly 16 and associated components which vary the radial distance of the rollers 20 from the drum axis 22. Each roller 20 is supported by a pair of support columns 24 which retain the axial bearings 34 at each end of the roller. The hub assembly 16 movably supports the support columns 24 in slidable engagement. The hub assembly includes a pair of hubs 26 which are preferably threadably engaged with a hub connector tube 28, so as to displace both hubs 26 in tandem.

In the preferred embodiment, a reciprocating arrangement, i.e. an endplate containing eight threaded bolts, is used for indexing the hub assembly 16 parallel to the drum axis 22 thereby indexing the support column 24 in or out to either increase or decrease the drum 10 outer diameter. The eight threaded bolts are evenly distributed across the endplate 64 at the discharge end of the drum 10 of both pusher bolts 60 and puller bolts 62. The pusher bolts 60 and the puller bolts 62 are alternately spaced around the endplate 64 in an even manner.

The pusher bolts 60 are used to index the hub assembly parallel to the drum axis 22 toward the charge end of the drum 10. In order to engage movement of the hub assembly 16, the pusher bolts 60 are screwed inward and the puller bolts 62 loosened with each turn of the pusher bolt. This motion increases the outer diameter of the drum 10.

The puller bolts 62 are used to index the hub assembly 16 parallel to the drum axis 22 and towards the discharge end of the drum 10. The puller bolts 62 are threadably engaged to the hub 26 on the discharge end of the drum 10. In order to engage movement of the hub assembly 16, the puller bolts 62 are screwed in and the pusher bolts 60 loosened with each turn of the puller bolts 62. This motion decreases the outer diameter of the drum. Alternatively, the reciprocating arrangement can include one or more spring-biased bolts to selectively vary and maintain the indexing position of the hub assembly 16. Any similar reciprocating arrangement can be used without departing from the invention.

Each hub 26 has a substantially frusto-conical tapered surface 30. The hubs 26 are mounted coaxially with the drum 10 (i.e. the frusto-conical axis is collinear with the drum axis 22). The support columns 24 engage the tapered surface 30 of the respective hubs 26, so that upon displacement of the support columns 24 along the tapered surfaces 30, the support columns 24 and the rollers 20 supported therewith vary in their radial distance from the drum axis 22.

In the preferred embodiment, the support columns 24 are held in place by respective support column guides 32, which permit radial displacement of the support columns 24 but prohibit axial displacement along the longitudinal axis 22 of the drum. Upon axial displacement of the hub assembly 16 between extreme positions P1 and P2, the support columns 24 slide up and down the tapered surface 30, thereby varying the radial position perpendicular to the drum axis 22 of the rollers between maximum R1 and minimum R2 positions, which correspond respectively to the maximum and minimum outer drum diameters. In the preferred embodiment, the drum diameter can be between 21 and 60 inches. However, it should be appreciated that larger and smaller diameter drums can be made without departing from the invention.

In order to securely engage the hubs 26, each support column 24 preferably ends in a T-shaped portion 40 which is received within a respective T-slot 42, formed on the tapered surface 30 of the hub 26. Upon 2 displacement of the hub assembly 16, the support columns 24 are slidably retained by engagement of the respective T-shaped portions 40 with the respective T-slots 42.

Figure 4A:
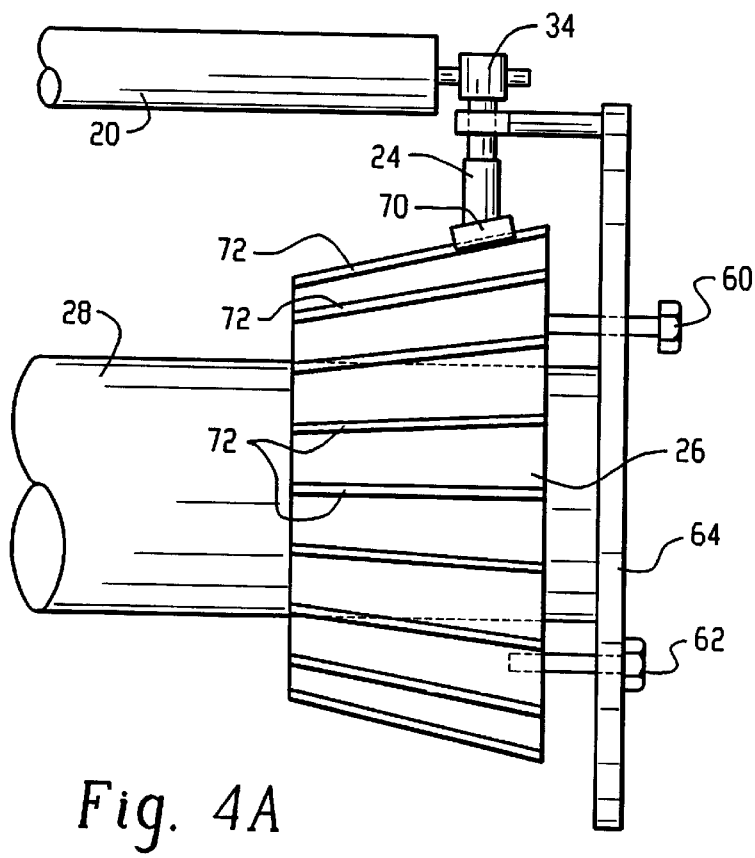
FIGS. 4A and 4B are respective side-sectional and oblique partial views illustrating an alternate hub engagement assembly as according to the present invention.
Figure 4B:
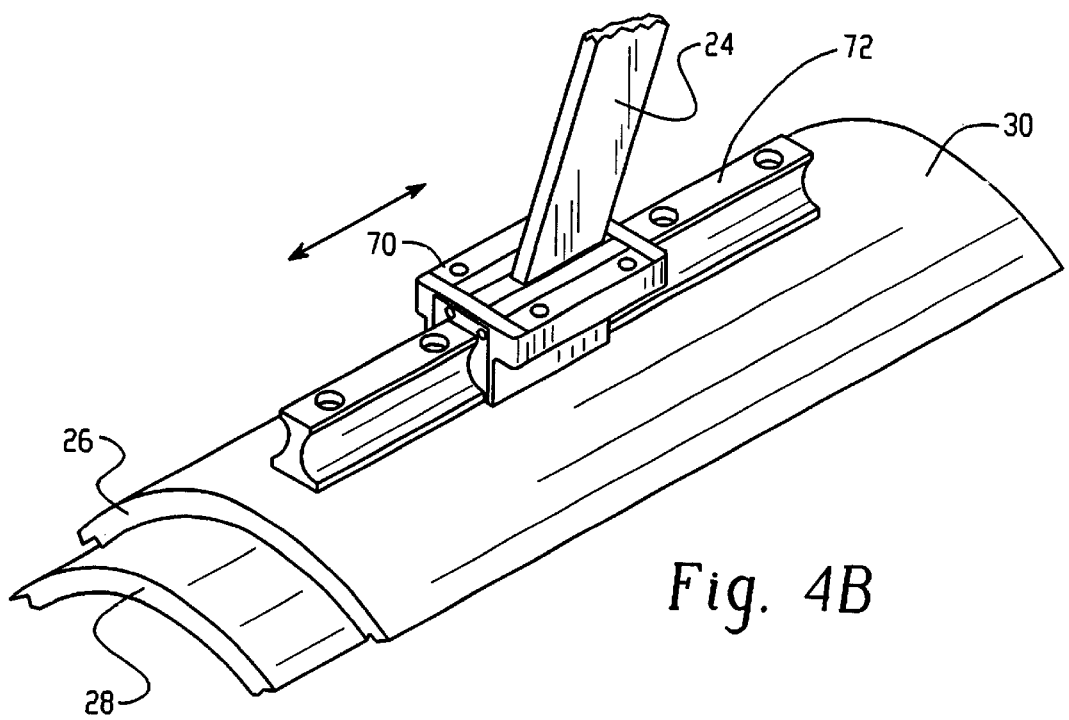

In an alternative embodiment for engaging the hubs 26, as shown in FIGS. 4A and 4B, each support column 24 can be connected to a linear bearing 70 attached to a rail 72, affixed to the tapered surface 30 of the hub 26. Upon displacement of the hub assembly 16 the support columns 24 are slidably retained by the linear bearing 70 onto the rail 72. Of course, it should be appreciated that other displacement schemes could be contemplated without departing from the invention.

The present invention, as described herein, can provide a variable drum diameter between at least two standard conduit sizes, thus saving the expense of acquiring and maintaining multiple apparatuses. The invention can also be used to achieve minute adjustments to the diameter of the drum, and the corresponding diameter of the ultimate conduit product. In this way, residence time can be shortened, since the resultant slight decrease in conduit diameter by increasing manufacturing speed can be offset by a corresponding increase in drum diameter. Using the previous apparatus, plastic is optimally extruded at a rate of about 1000 lbs./hr. for most common pipe sizes. With the present invention, this rate can be increased to between 1500–2000 lbs./hr., or even higher, with a corresponding increase in rate of manufacture of between 50–100% or more.

As described hereinabove, the present invention solves many problems associated with previous systems, and presents improved efficiency and reduced expense. However, it will be appreciated that various changes in the details, materials and arrangements of parts which have been herein described and illustrated in order to explain the nature of the invention may be made by those skilled in the art within the principle and scope of the invention as expressed in the appended claims.

I claim:

1. An apparatus for use with an extruder producing a strip of thermoplastic comprising:

a plurality of rollers in a circular array centered on an axis and defining the diameter of a drum, each of said rollers having a first end and a second end;

a first set of radial support columns engaging said rollers at said first ends and extending from said first ends toward said axis;

a second set of radial support columns engaging said rollers at said second ends and extending from said second ends toward said axis;

first and second tapered bases supported to move relative to each other simultaneously and equally in the same direction along said axis, said first tapered base engaging said first set of radial support columns and said second tapered base engaging said second set of radial support columns to respectively impart radial movement to said first and said second sets of radial support columns upon axial movement of said tapered bases; and an indexing mechanism operative to move said tapered bases relative to each other simultaneously and equally in the same direction along said axis to respectively impart said radial movement to said first and said second sets of radial support columns, thereby to vary the diameter of said drum.

2. An apparatus as defined in claim 1 further comprising a first set of guide structures radially interposed between said first tapered base and said first ends of said rollers and configured to block movement circumferentially while allowing movement radially of said first set of radial support columns thereby to guide said radial movement; and a second set of guide structures radially interposed between said second tapered base and said second ends of said rollers and configured to block movement circumferentially while allowing movement radially of said second set of radial support columns thereby to guide said radial movement.

* * * * *